(12) United States Patent
Il (10) Patent No.: US 9,426,320 B1
(45) Date of Patent: Aug. 23, 2016

(54) IMAGE PROCESSING APPARATUS HAVING A POWER SUPPLY SOURCE SELECTOR

(71) Applicants: KABUSHIKI KAISHA TOSHIBA, Tokyo (JP); TOSHIBA TEC KABUSHIKI KAISHA, Tokyo (JP)

(72) Inventor: Motoki Il, Izunokuni Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/721,976

(22) Filed: May 26, 2015

(51) Int. Cl.
*G06F 15/00* (2006.01)
*G06F 1/00* (2006.01)
*G06K 15/00* (2006.01)
*H04N 1/00* (2006.01)

(52) U.S. Cl.
CPC ....... *H04N 1/00896* (2013.01); *H04N 1/00907* (2013.01); *H04N 2201/0094* (2013.01)

(58) Field of Classification Search
USPC .................................................. 358/1.1–1.18
See application file for complete search history.

(56) References Cited

U.S. PATENT DOCUMENTS

| 7,769,312 B2 | 8/2010 | Higashi | |
| 8,432,561 B2 * | 4/2013 | Ebisui | G06F 3/1213 358/1.1 |
| 8,600,563 B2 * | 12/2013 | Ben-Yaacov | F24D 11/0228 700/278 |

FOREIGN PATENT DOCUMENTS

JP 2004310421 A 11/2004

* cited by examiner

*Primary Examiner* — Douglas Tran
(74) *Attorney, Agent, or Firm* — Patterson & Sheridan, LLP (57) ABSTRACT

An image processing apparatus includes an image processing unit configured to carry out processing on an image formed on a sheet, a power unit for the image processing unit connected to a plurality of power grids, a storage unit configured to store information about cost of power supplied from each of the power grids, and a control unit configured to select one of the power grids based on the stored information, and control the power unit to supply power from the selected power grid to the image processing unit.

20 Claims, 7 Drawing Sheets

(12) United States Patent

IMAGE PROCESSING APPARATUS HAVING A POWER SUPPLY SOURCE SELECTOR

FIELD

Embodiments described herein relate generally to an image processing apparatus having a power supply source selector.

BACKGROUND

An image processing apparatus such as multi-function peripheral (MFP) includes a unit that consumes a large amount of energy. For example, an image processing apparatus includes a fixing unit that fixes an image on a sheet using heat, and a large amount of energy is needed for the fixing. Therefore, a power expense for the image processing apparatus may be significantly large.

In the related art, an image forming apparatus sets a printing execution time to lower the power expense. However, as the printing execution time is set mainly during night time during which the power cost is low, a user may not be able to obtain the printed material at a preferred time.

DETAILED DESCRIPTION

In general, according to one embodiment, an image processing apparatus includes an image processing unit configured to carry out processing on an image formed on a sheet, a power unit for the image processing unit connected to a plurality of power grids, a storage unit configured to store information about cost of power supplied from each of the power grids, and a control unit configured to select one of the power grids based on the stored information, and control the power unit to supply power from the selected power grid to the image processing unit.

Hereinafter, an image forming apparatus according to the embodiment will be described with reference to the drawings.

Figure 1:
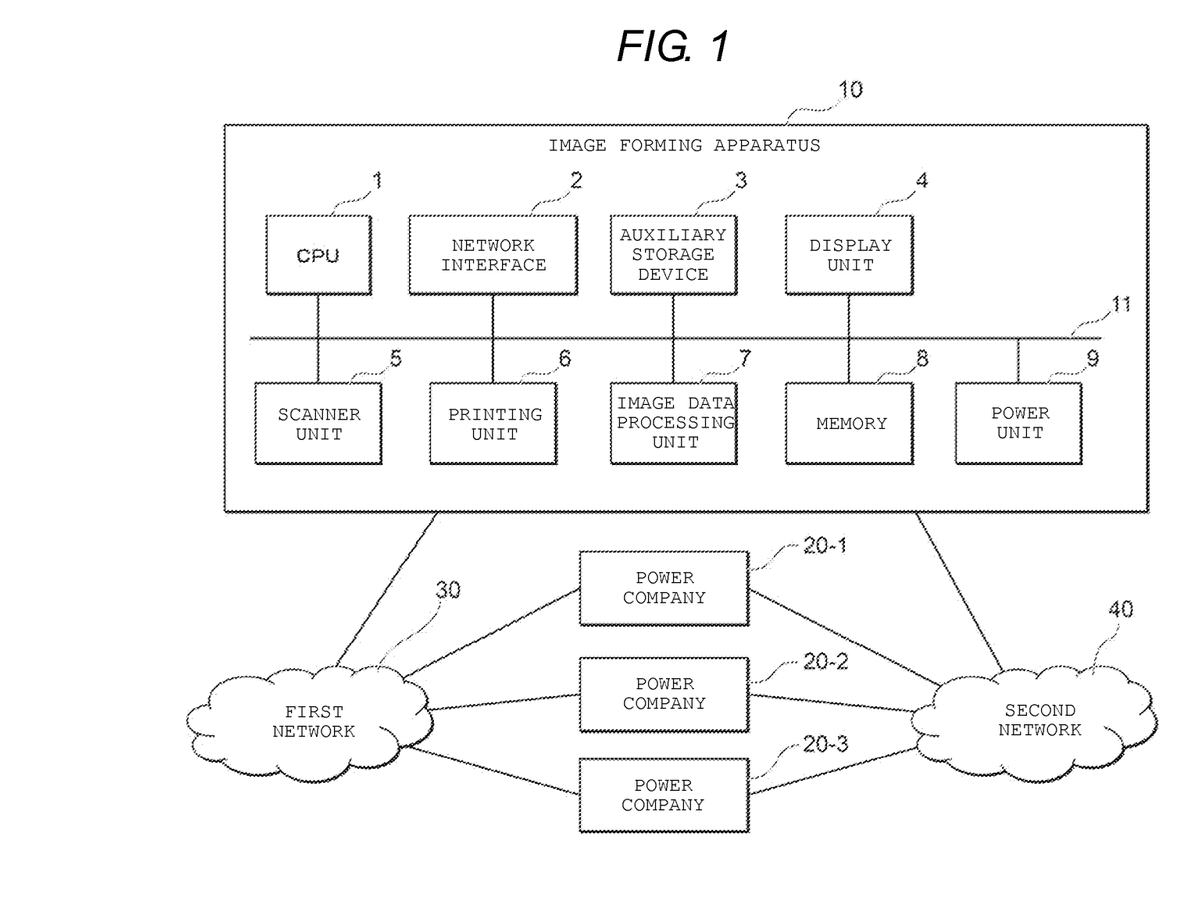
FIG. 1 is a schematic block diagram of a power supply source determination system including an image forming apparatus according to an embodiment.

FIG. 1 is a schematic block diagram of a power supply source determination system including an image forming apparatus 10 according to the embodiment.

The power supply source determination system includes the image forming apparatus 10. A plurality of power companies 20-1 to 20-3 are connected to the power supply source determination system. The image forming apparatus 10 and the power companies 20-1 to 20-3 are connected and data communication can be carried out therebetween via a second network 40. In the following description, when the power companies 20-1 to 20-3 are not particularly distinguished from each other, the power companies 20-1 to 20-3 are generally referred to as the power companies 20.

The image forming apparatus 10 reads a surface of a sheet and generates digital data (an image file). The image forming apparatus 10 is, for example, a multi-function peripheral (MFP) capable of forming a toner image on a sheet. The sheet is, for example, a medium such as a paper sheet on which a document, text, images, and the like are written or printed and any sheet may be used as long as the surface of the sheet can be read by the image forming apparatus 10.

The power company 20 is a power supply source that supplies power to the image forming apparatus 10. The power company 20 transmits information (hereinafter referred to as "power cost information") regarding a power cost in response to a request from the image forming apparatus 10 to the image forming apparatus 10. The power cost information refers to information regarding cost for usage of the power and is, for example, cost per unit time.

The first network 30 may be a network configured in any manner. The first network 30 is, for example, a power grid.

The second network 40 may be a network configured in any manner. The second network 40 is, for example, the Internet.

Next, a specific configuration of the image forming apparatus 10 will be described. The image forming apparatus 10 includes a central processing unit (CPU) 1, a network interface 2, an auxiliary storage device 3, a display unit 4, a scanner unit 5, a printing unit (image processing unit) 6, an image data processing unit 7, a memory 8, and a power unit 9. The units included in the image forming apparatus 10 are connected to each other through an internal bus 11 so that data are mutually input and output.

The CPU 1 controls an operation of each unit of the image forming apparatus 10. The CPU 1 executes various processes by executing programs. The CPU 1 receives an instruction input by an operator through the display unit 4. The CPU 1 executes a control process based on the received operation instruction. The CPU 1 determines the power company 20 (hereinafter referred to as a "power supply company") serving as a power supply source of the image forming apparatus 10 based on the power cost information. Then, the CPU 1 executes a process using the power supplied from the determined power supply company. In the following description, as a specific example of the process, the image forming apparatus 10 executes a printing process of print data. The print data refers to digital data corresponding to the surface of the sheet read by the scanner unit 5. The printing process refers to a process of printing an image corresponding to the print data. Specifically, the printing process is a process in which the CPU 1 provides an instruction to print an image based on the print data to the printing unit 6 and the printing unit 6 prints the image based on the print data in response to the instruction from the CPU 1.

The network interface 2 transmits and receives data to and from other apparatuses. The network interface 2 operates as an input interface and receives data transmitted from other apparatuses. For example, the network interface 2 receives the power cost information from the power companies 20 via the second network 40. The network interface 2 operates as an output interface and transmits data to other apparatuses.

The auxiliary storage device 3 is, for example, a hard disk or a solid state drive (SSD) and stores various kinds of data. For example, the auxiliary storage device 3 stores digital data generated by the scanner unit 5. The auxiliary storage device 3 may store the power cost information.

The display unit 4 is a display device such as a liquid crystal display or an organic electro-luminescence (EL) display. The display unit 4 operates as an output interface and displays texts or images. The display unit 4 also operates as an input interface and receives an instruction input by a user. The CPU 1 is notified of the instruction input to the display unit 4.

The scanner unit 5 is, for example, a color scanner that includes a contact image sensor (CIS) or charge coupled devices (CCDs). The scanner unit 5 reads a sheet using the sensor and generates digital data.

The printing unit 6 prints images, texts, or the like on a sheet.

The image data processing unit 7 executes image processing on the digital data generated by the scanner unit 5.

The memory 8 is, for example, a random access memory (RAM). The memory 8 temporarily stores data to be used by each unit of the image forming apparatus 10. For example, the memory 8 stores the power cost information. The memory 8 may store the digital data generated by the scanner unit 5.

The power unit 9 converts an alternating current supplied from the power company 20 via the first network 30 into a direct current and supplies the power to each functional unit.

Figure 2:
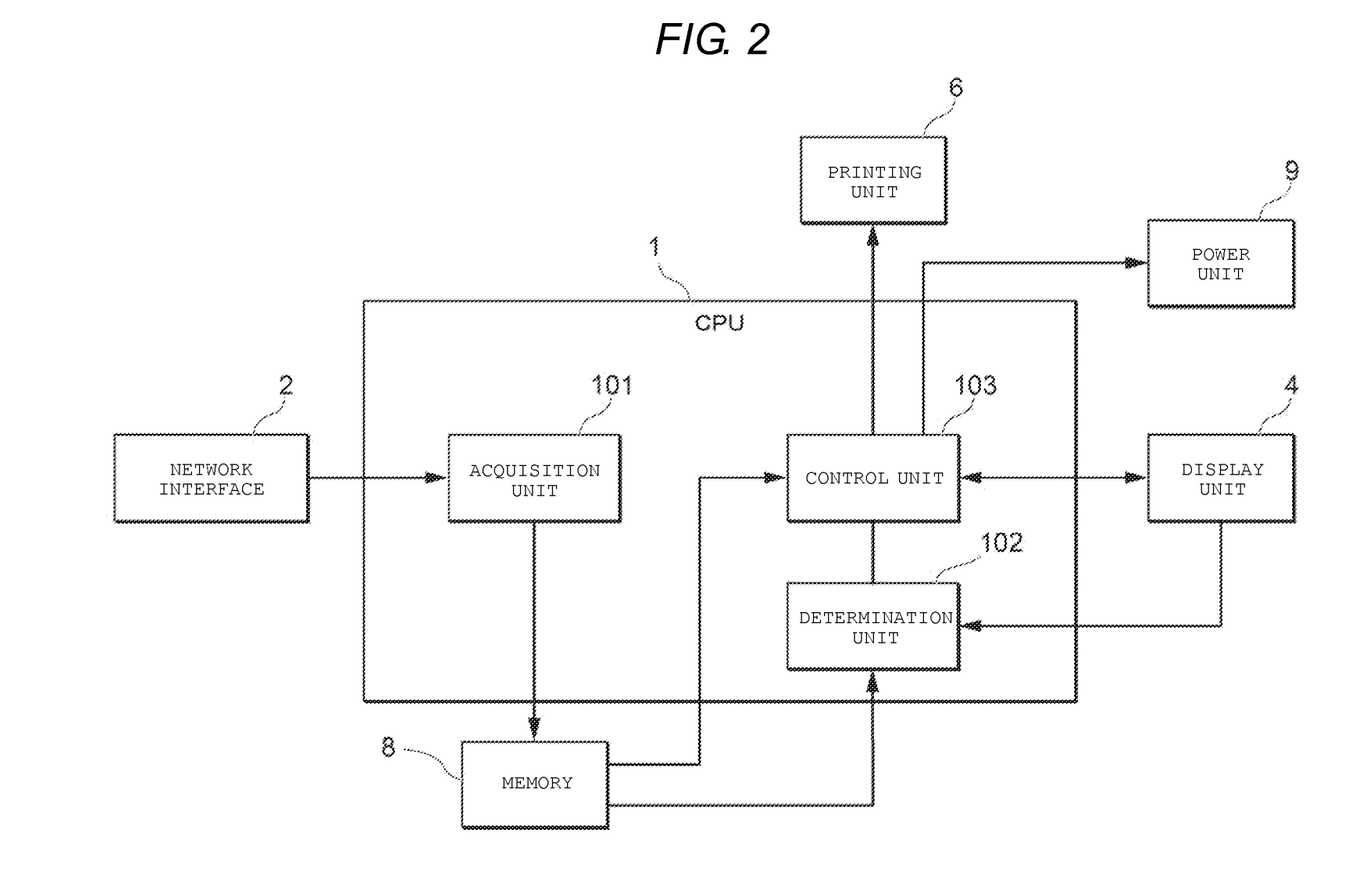
FIG. 2 is a schematic block diagram of a CPU of the image forming apparatus.

FIG. 2 is a schematic block diagram illustrating the functional configuration of the CPU 1. The CPU 1 includes an acquisition unit 101, a determination unit 102, and a control unit 103.

The acquisition unit 101 acquires the power cost information received by the network interface 2. The acquisition unit 101 generates an acquisition request for the power cost information and transmits the acquisition request to the power companies 20 via the network interface 2. The acquisition request includes information (hereinafter referred to as "period-of-time information") indicating a period of time for which a request for the power cost information is generated. For example, the period-of-time information may be information indicating each period of time in one day or may be information indicating a predetermined period of time in a day. For example, the power cost information for each period of time in a day indicates information regarding a power cost for each hour from 0 o'clock to 24 o'clock. For example, the power cost information for the predetermined period of time indicates information regarding a power cost during the period of time from a certain time to a certain time. When the power cost information for the predetermined period of time is requested, the acquisition unit 101 generates an acquisition request including new period-of-time information and transmits the acquisition request to the power companies 20 after a predetermined time passes. The acquisition unit 101 records the acquired power cost information on the memory 8.

The determination unit 102 determines the power supply company and a printing time period based on the power cost information acquired by the acquisition unit 101. For example, the determination unit 102 determines the power company 20 satisfying a predetermined condition as the power supply company. For example, the predetermined condition may be a condition that the power cost is less than a predetermined threshold value. In the following description, the power company satisfying the predetermined condition is referred to as a low-cost company. That is, the determination unit 102 determines the low-cost company as the power supply company. When there is a plurality of low-cost companies, the determination unit 102 may determine the low-cost company with the lowest power cost as the power supply company.

The control unit 103 controls each functional unit of the CPU 1. For example, when processing target data is input, the control unit 103 executes a printing process on the processing target data using the power supplied from the determined power supply company. In the embodiment, the processing target data refers to print data.

Figure 3:
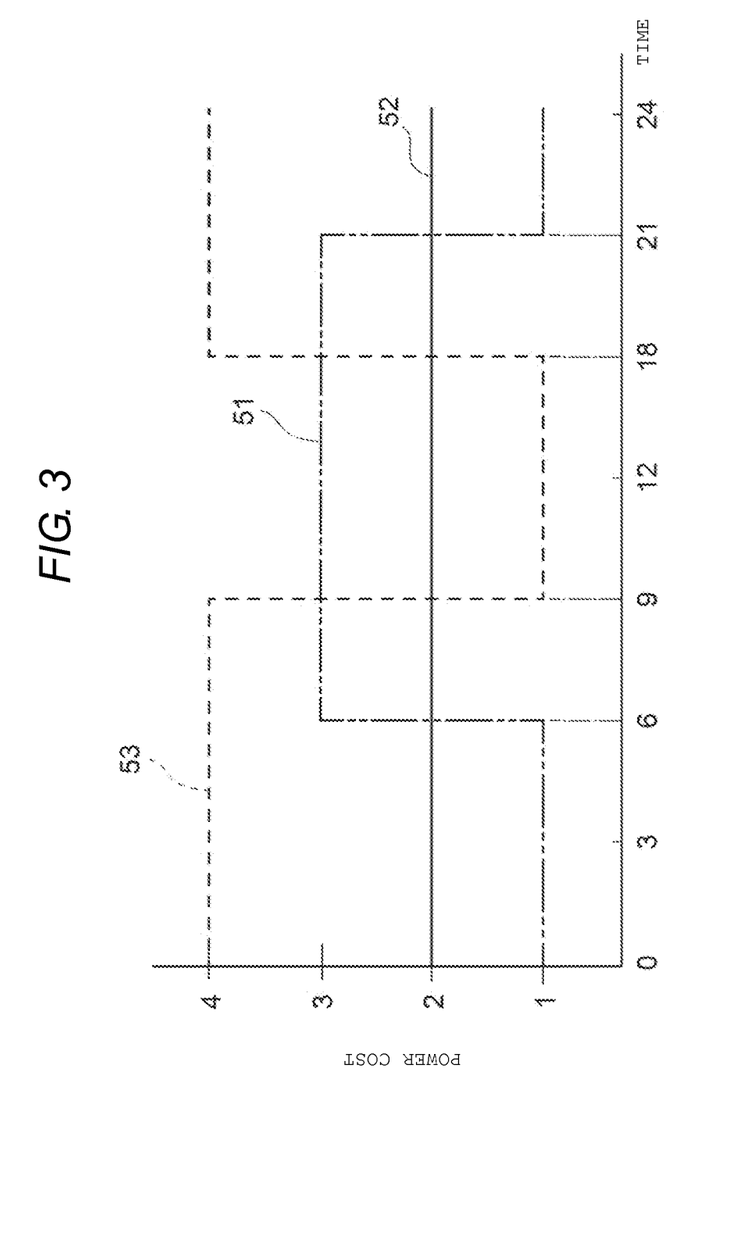
FIG. 3 is an example of power cost of a plural power companies in a day.

FIG. 3 is a diagram illustrating a specific example of the power cost information.

In FIG. 3, the vertical axis represents a power cost and the horizontal axis represents a time in a day. In FIG. 3, numerals 1 to 4 are shown as indexes indicating the magnitude of the power cost. The lower the numeral is, the lower the power cost is. That is, numeral 1 indicates that the power cost is the lowest and numeral 4 indicates that the power cost is the highest.

In FIG. 3, for the power companies 20, the indices of the power cost from 0 o'clock to 24 o'clock are indicated by polygonal line graphs 51 to 53. The polygonal line graph 51 indicates the index of the power cost of the power company 20-1. The polygonal line graph 52 indicates the index of the power cost of the power company 20-2. The polygonal line graph 53 indicates the index of the power cost of the power company 20-3. More specifically, the power cost of each power company is set as follows.

For the power company 20-1, the power cost is the lowest for a period of time from 0 o'clock to 6 o'clock and a period of time from 21 o'clock to 24 o'clock. On the other hand, the power cost is higher for a period of time from 6 o'clock to 21 o'clock, compared to the period of time from 0 o'clock to 6 o'clock and the period of time from 21 o'clock to 24 o'clock.

For the power company 20-2, the power cost is not changed for a period of time from 0 o'clock to 24 o'clock. That is, for the power company 20-2, the power cost is constant for a period of time from 0 o'clock to 24 o'clock.

For the power company 20-3, the power cost is the highest for a period of time from 0 o'clock to 9 o'clock and a period of time from 18 o'clock to 24 o'clock. On the other hand, the power cost is the lowest for a period of time from 9 o'clock to 18 o'clock.

As described above, when the image forming apparatus 10 is operated during a period of time from 0 o'clock to 6 o'clock, the power expense may be reduced by using the power supplied from the power company 20-1. When the image forming apparatus 10 is operated during a period of time from 6 o'clock to 9 o'clock, the power expense may be reduced by using the power supplied from the power company 20-2. When the image forming apparatus 10 is operated during a period of time from 9 o'clock to 18 o'clock, the power expense may be reduced by using the power supplied from the power company 20-3. When the image forming apparatus 10 is operated during a period of time from 18 o'clock to 21 o'clock, the power expense may be reduced by using the power supplied from the power company 20-2. When the image forming apparatus 10 is operated during a period of time from 21 o'clock to 24 o'clock, the power expense may be reduced by using the power supplied from the power company 20-1.

The determination unit 102 determines the power supply company based on the power cost information illustrated in FIG. 3. Then, the control unit 103 executes the printing process for the print data using the power supplied from the power supply company based on the determination result of the determination unit 102.

Figure 4:
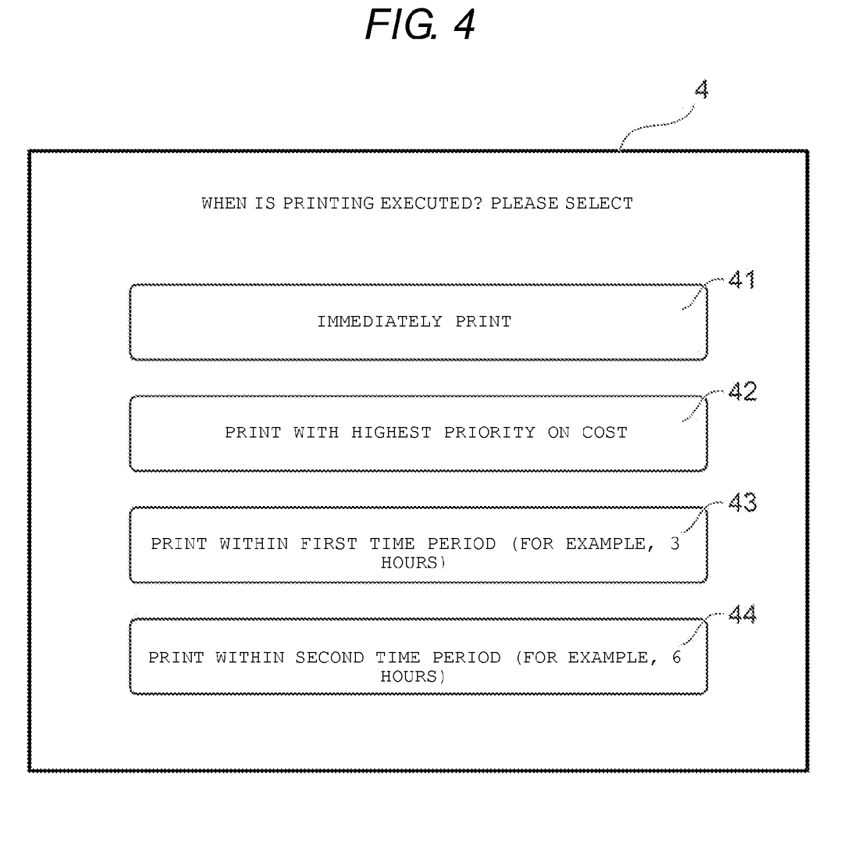
FIG. 4 is a diagram illustrating a display screen displayed on a display unit of the image forming apparatus.

FIG. 4 illustrates a display example displayed on the display unit 4.

A display screen illustrated in FIG. 4 is displayed when the user operates the display unit 4. The display unit 4 displays an instruction to the user and a plurality of setting icons 41 to 44 used for the user to select an execution time of the printing. The setting icon 41 is an icon used to immediately execute the printing process for the print data. Here, "immediate" indicates a time immediately after the user selects the setting icon 41 and then selects a start button for the printing. The start button is a button that is used when an instruction to execute the printing is input to the image forming apparatus 10. The setting icons 42 to 44 are icons used to execute the printing process for the print data with priority on the power cost to some extent. The setting icon 42 is an icon used to execute the printing process for the print data with the highest priority on the power cost. The setting icons 43 and 44 are icons used to execute the printing process for the print data with priority for the power cost during a restricted time period. The CPU 1 may display the setting icon selected by the user in a display form different from the other setting icons. For example, the CPU 1 causes the display unit 4 to display the setting icon selected by the user so that the color of the selected icon is different from the color of the other setting icons.

The CPU 1 executes the printing process at a different timing according to the setting icon selected by the user. When the user selects the start button for the printing after the selection of the setting icon 41, the CPU 1 executes the printing process in response to the start button being selected. Therefore, according to the setting indicated by the setting icon 41, the CPU 1 executes the printing process using the power of the power company 20 supplying the power to the own apparatus at the present time. In the following description, the setting (setting in which the process is executed immediately) when the setting icon 41 is selected is referred to as immediate execution setting. In the following description, the setting icon 41 is referred to as an immediate execution setting icon.

When the start button for the printing is selected by the user after the selection of the setting icon 42, the CPU 1 determines the low-cost company and the printing time period. The CPU 1 does not execute the printing process until the printing time period comes. Meanwhile, the CPU 1 causes the auxiliary storage device 3 or the memory 8 to store the print data. When the determined printing time period comes, the CPU 1 executes the printing process for the print data using the power supplied from the low-cost company. In this case, the CPU 1 executes the printing process on all of the print data stored in the auxiliary storage device 3 or the memory 8 before the determined printing time period comes. When the printing time period comes, the CPU 1 may execute the printing process at any time. In the following description, the setting (setting in which the process is executed with the highest priority on the cost for the printing) when the setting icon 42 is selected is referred to as cost highest-priority setting. In the following description, the setting icon 42 is referred to as a cost highest-priority setting icon.

When the start button for the printing is selected by the user after the selection of the setting icon 43 or 44, the CPU 1 determines the low-cost company and the printing time period within the restricted time period. For example, for the setting icon 43, a first time period (for example, 3 hours) is set as the restricted time period. In this case, a time period from a time at which the start button is selected to a time at which the first time period (for example, 3 hours) passes is the restricted time period. For the setting icon 44, a second time period (for example, 6 hours) is set as the restricted time period. In this case, a time period from a time at which the start button is selected up to a time at which the second time period (for example, 6 hours) passes is the restricted time period.

The CPU 1 determines the low-cost company and the printing time period within the restricted time period set in accordance with the selection of the setting icon by the user. The CPU 1 does not execute the printing process before the determined printing time period within the restricted time period. Meanwhile, the CPU 1 causes the auxiliary storage device 3 or the memory 8 to store the print data. When the determined time comes, the CPU 1 executes the printing process on the print data using the power supplied from the low-cost company. In this case, the CPU 1 executes the printing process on all of the print data stored in the auxiliary storage device 3 or the memory 8 within the determined printing time period. During the printing time period, the CPU 1 may execute the printing process at any time. In the following description, the setting (setting in which the process is executed with priority on the cost within the restricted time period) when the setting icon 43 or 44 is selected is referred to restricted time period setting. In the following description, the setting icons 43 and 44 are referred to as restricted time period setting icons.

The user may select an execution time of the printing process for the print data using one of the setting icons 41 to 44 described above. The number of setting icons may be plural or singular.

Next, a specific process of the CPU 1 when the restricted time period setting icon is selected will be described in detail with reference to FIGS. 3 and 4. As preliminary setting, the current time (present time) is assumed to be 0 o'clock. As a predetermined condition, the power cost is assumed to be less than 2.

The user operates the display unit 4 to input the setting of the printing process. For example, the user is assumed to select the restricted time period setting icon (for example, the setting icon 43). Through this process, the CPU 1 determines the low-cost company and the printing time period within the restricted time period with reference to the power cost information illustrated in FIG. 3. In this case, the CPU 1 determines the low-cost company and the printing time period within the period of time from 0 o'clock to 3 o'clock. The determination result includes information indicating that the power company 20-1 is the low-cost company. The determination result also includes information indicating that the printing time period is from 0 o'clock to 3 o'clock. That is, the CPU 1 determines the power company 20-1 as the power supply company. Then, the CPU 1 executes the printing process on the print data based on the determination result. At this time, the CPU 1 determines whether the power company 20 (hereinafter referred to as a "present power supply company") supplying the power to the own apparatus at the present time is the power company 20-1.

When the present power supply company is the power company 20-1, the CPU 1 executes the printing process on the print data using the power supplied from the power company 20-1 without switching of the power supply company. On the other hand, when the present power supply company is not the power company 20-1, the CPU 1 executes the switching of the power supply company. Specifically, the CPU 1 switches the power supply company to the power company 20-1. After the completion of the switching, the CPU 1 executes the printing process on the print data using the power supplied from the power company 20-1.

The above is the description of the specific process of the CPU 1 when the restricted-time period setting icon is selected.

Figure 5:
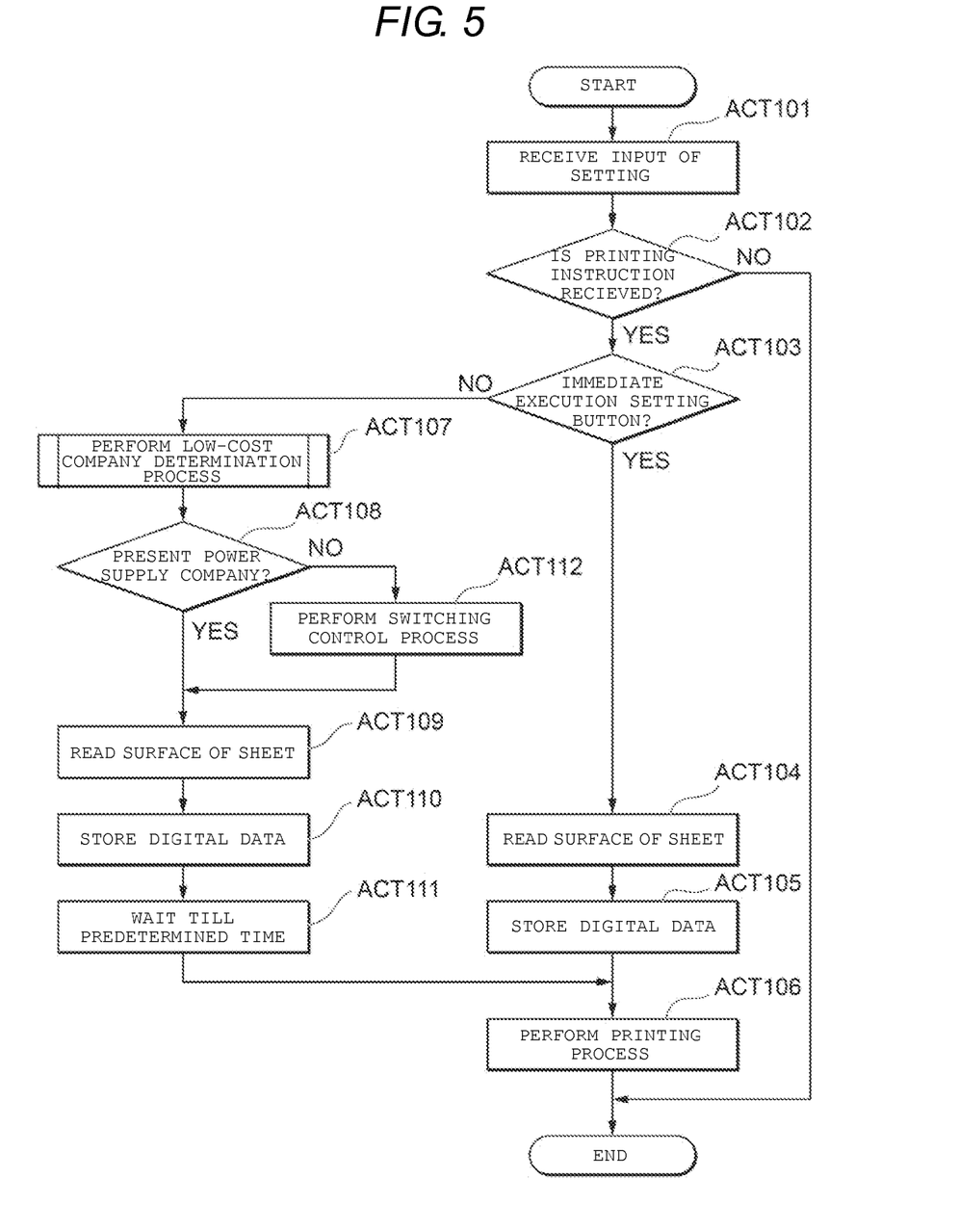
FIG. 5 is a flowchart of an operation carried out by the image forming apparatus.

FIG. 5 is a flowchart of an operation of the image forming apparatus 10. Here, the power cost information regarding the periods of time in one day for each power company 20 is stored in advance in the memory 8.

First, the display unit 4 receives an input about the printing setting by the user (ACT 101). For example, the display unit 4 displays each setting icon on the screen and receives an input about the printing setting by the user. When the input about the printing setting is received, the determination unit 102 is notified of the input about the printing setting on the display unit 4. For example, the determination unit 102 is notified of information regarding the setting icon selected by the user. Next, the determination unit 102 determines whether the instruction to execute the printing is input (ACT 102). When the instruction to execute the printing is not input (NO in ACT 102), the image forming apparatus 10 ends the process.

On the other hand, when the instruction to execute the printing is input (YES in ACT 102), the determination unit 102 determines whether the selected setting icon is the immediate execution setting icon (ACT 103). When the selected setting icon is the immediate execution setting icon (YES in ACT 103), the CPU 1 provides an instruction to read a surface of a sheet to the scanner unit 5. The scanner unit 5 reads the surface of the set sheet in response to receiving the instruction from the CPU 1 and generates digital data (print data) (ACT 104).

The control unit 103 causes the auxiliary storage device 3 to store the generated print data (ACT 105). Thereafter, the control unit 103 executes the printing process for the print data (ACT 106). Thereafter, the image forming apparatus 10 ends the process.

When the selected setting icon is not the immediate execution setting icon in ACT 103 (NO in ACT 103), the determination unit 102 executes a low-cost company determination process (ACT 107). The low-cost company determination process refers to a process of determining the low-cost company, which is the power supply company, and the printing time period satisfying a predetermined condition based on the selected setting icon and the power cost information. The low-cost company determination process will be described below. The determination unit 102 outputs a notification including information indicating the determined low-cost company and information indicating the determined printing time period to the control unit 103.

The control unit 103 determines whether the low-cost company indicated by the information included in the notification output from the determination unit 102 is the present power supply company (ACT 108). When the low-cost company is the present power supply company (YES in ACT 108), the CPU 1 provides an instruction to read a surface of a sheet to the scanner unit 5. The scanner unit 5 reads the surface of the set sheet in response to the instruction from the CPU 1 and generates digital data (ACT 109).

The CPU 1 causes the auxiliary storage device 3 to store the generated digital data (ACT 110). Thereafter, the image forming apparatus 10 waits till the printing time period that is determined in the low-cost company determination process (ACT 111). When the printing time period determined in the low-cost company determination process comes, the image forming apparatus 10 executes the process of ACT 106.

When the low-cost company is not the present power supply company in ACT 108 (NO in ACT 108), the CPU 1 executes a switching control process (ACT 112). The switching control process refers to a process of switching the power supply company. For example, the CPU 1 switches the connection with the power company 20 connected at the present time to connection with the power company 20 which is the low-cost company indicated by the information included in the notification. Thus, the image forming apparatus 10 may execute the printing process on the print data using the power supplied from the low-cost company. Thereafter, the image forming apparatus 10 executes the processes subsequent to ACT 109.

Figure 6:
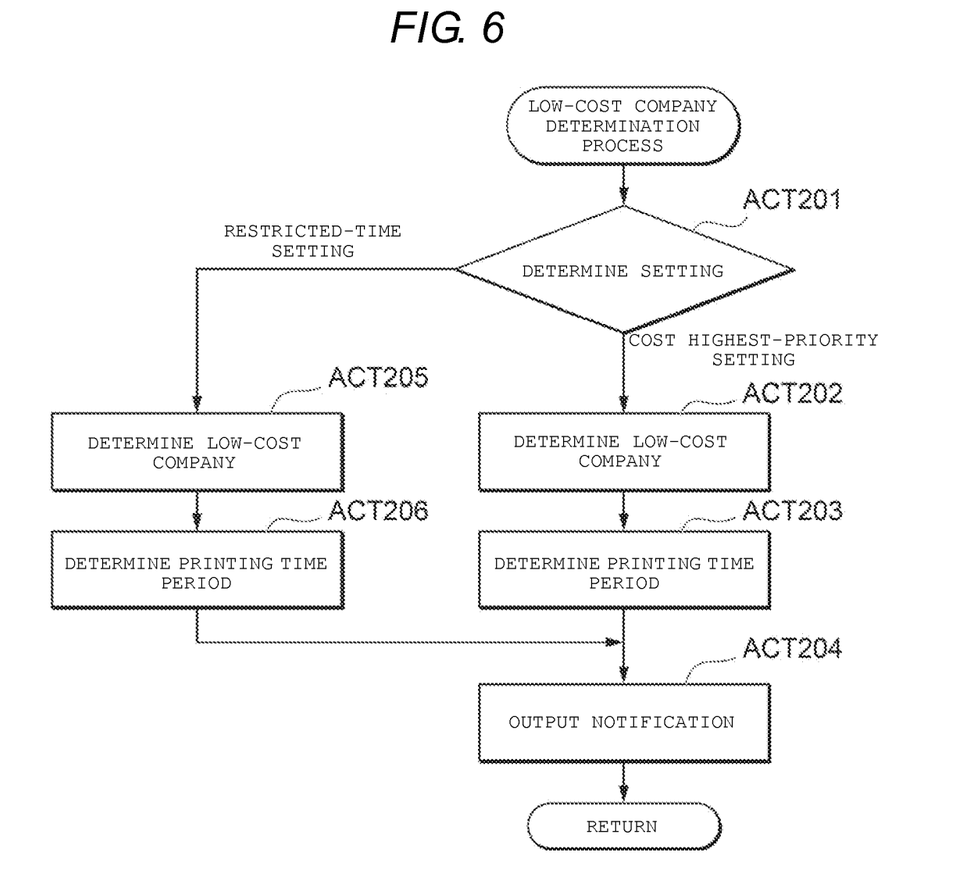
FIG. 6 is a flowchart of a low-cost company determination process.

FIG. 6 is a flowchart of the low-cost company determination process.

The determination unit 102 determines the setting input in ACT 101 (ACT 201). For example, the determination unit 102 determines the setting according to the setting icon selected by the user. When the selected setting icon is the cost highest-priority setting icon, the determination unit 102 determines that the cost highest-priority setting is input. When the input setting is the cost highest-priority setting (the cost highest-priority setting in ACT 201), the determination unit 102 determines the low-cost company (ACT 202). Specifically, the determination unit 102 determines the power company 20 of which the power cost is less than the predetermined threshold value with reference to the power cost information stored in the memory 8. When there are the plurality of the power companies 20 of which the power cost is less than the predetermined threshold value, the determination unit 102 may determine the power company 20 with the lowest power cost as the low-cost company. Next, the determination unit 102 determines the printing time period based on the power cost information of the determined power company 20 with reference to the power cost information stored in the memory 8 (Act 203). For example, the determination unit 102 determines, as the printing time period, the period of time with the lowest power cost in a day based on the power cost information of the determined power company 20. Thereafter, the determination unit 102 outputs a notification including the determination result to the control unit 103 (ACT 204).

When the selected setting icon is the restricted-time period setting icon in ACT 201, the determination unit 102 determines that the restricted-time period setting is input. When the input setting is the restricted-time period setting (the restricted-time period setting in ACT 201), the determination unit 102 determines the low-cost company (ACT 205). Specifically, the determination unit 102 determines the power company 20 of which the power cost is less than the predetermined threshold value during the restricted time period with reference to the power cost information stored in the memory 8. The restricted time period is a time period associated with the restricted-time period setting icon. When there is a plurality of power companies 20 of which the power cost is less than the predetermined threshold value within the restricted time period, the determination unit 102 may determine the power company 20 with the lowest power cost as the low-cost company. Next, the determination unit 102 determines the printing time period based on the power cost information of the determined power company 20 with reference to the power cost information stored in the memory 8 (ACT 206). For example, the determination unit 102 determines as the printing time period the period of time with the lowest power cost within the restricted time period. Thereafter, the determination unit 102 outputs a notification including the determination result to the control unit 103 (ACT 204).

In the image forming apparatus 10 with the above-described configuration, the power supply company is determined based on the power cost per unit time period for each of the plurality of power companies. At this time, the image forming apparatus 10 determines the power company 20 of which the power cost is less than the predetermined threshold value as the power supply company. Then, the image forming apparatus 10 executes the printing process for the print data using the power supplied from the determined power supply company. Accordingly, the image forming apparatus 10 may execute the printing process at a lower the power expense. Since the power supply source is switched among the plurality of power companies according to the determination result of the power supply company, the printing process may be executed during either day or night. Therefore, usability of the image forming apparatus 10 can be improved.

In the display unit 4 of the image forming apparatus 10, the plurality of setting icons with which the execution time of the printing may be set by the user are provided. Accordingly, the user may freely select the execution time of the printing. Thus, the printing process may be executed based on the user preference. Therefore, the usability of the image forming apparatus 10 can be improved.

In the image forming apparatus 10, the restricted time period setting icon is provided in addition to the immediate execution icon and the cost highest-priority setting icon. As the restricted time period may not be the time period during which the power cost is the lowest in a day, the power expense may not be the lowest when the restricted time period setting icon is selected. However, the usability can still be improved. Hereinafter, the advantage will be described in detail. The user has to wait in some cases for a long period of time (for example, 12 hours) until the printing is executed, after the selection of the cost highest-priority setting icon and input of an execution instruction. In this case, the usability may be compromised with the power expense. The image forming apparatus 10 according to the embodiment includes the restricted-time period setting icon. When the restricted-time period setting icon is selected, the image forming apparatus 10 determines the power supply company within the restricted time period. At this time, the image forming apparatus 10 determines the low-cost company within the restricted time period as the power supply company. Then, the image forming apparatus 10 executes the printing process for the print data using the power supplied from the determined power supply company. Accordingly, the user may not necessarily wait for a long period of time until the printing is executed. Further, since the power from the low-cost company within the restricted time period is used, the power expense may also be reduced. However, since the image forming apparatus 10 determines the low-cost company within the restricted time period, the power cost may be higher than the power cost during the cost highest-priority setting, depending on the restricted time period. Therefore, the power expense may not be the lowest, but the usability may be improved.

Next, modification examples of the image forming apparatus 10 will be described.

In the embodiment, the image forming apparatus 10 is described as an example, but the technology employed in the embodiment is applicable to other apparatuses. For example, the technology is also applicable to a decoloring apparatus that decolors an image printed on a sheet with a decolorable material (for example, a decolorable toner, a decolorable ink, or a decolorable ink ribbon). In this case, the decoloring apparatus prompts a user to set an execution time at which a decoloring process is performed. Then, the decoloring apparatus executes the decoloring process using the power supplied from the low-cost company according to the execution time set by the user.

In the embodiment, the number of power companies 20 connected to the power supply source determination system is three, but the embodiment is not limited thereto. Four or more power companies 20 may be connected to the power supply source determination system or two power companies 20 may be connected thereto.

A scheduled process start time may be displayed in association with the cost highest-priority setting icon and the restricted-time period setting icon on the screen of the display unit 4 in FIG. 4. In the case of this configuration, the following process is executed. The CPU 1 determines the scheduled process start time to be displayed in association with the cost highest-priority setting icon and the restricted-time period setting icon based on the power cost information acquired from each power company 20. A case in which the power cost information shown in FIG. 3 is acquired and the present time is 7 o'clock will be exemplified below.

First, a method of determining the scheduled time to be displayed in association with the cost highest-priority setting icon will be described. The CPU 1 first acquires information indicating the power company 20 with the lowest power cost and information indicating the printing time period with reference to the power cost information. Next, the CPU 1 determines the scheduled process start time based on the acquired information. For example, the CPU 1 may determine a time which is closest to the present time of the printing time period indicated by the acquired information as the process start time. The CPU 1 may determine any time as the scheduled process start time when the time is within the printing time period indicated by the acquired information. Then, the CPU 1 causes the display unit 4 to display the determined scheduled process start time in association with the cost highest-priority setting icon.

Next, a method of determining the scheduled time to be displayed in association with the restricted-time period setting icon will be described. In this example, the restricted time period associated with the restricted-time period setting icon is the first time period (for example, 3 hours). The CPU 1 acquires information indicating the low-cost company and the printing time period within the first time period (for example, 3 hours) from the present time with reference to the power cost information. Next, the CPU 1 determines the scheduled process start time based on the acquired information. For example, the CPU 1 may determine a time which is the closest to the present time of the printing time period indicated by the acquired information as the scheduled process start time. The CPU 1 may determine any time as the scheduled process start time when the time is within the printing time period indicated by the acquired information. Then, the CPU 1 causes the display unit 4 to display the determined scheduled process start time in association with the restricted-time period setting icon. This process is dynamically executed. That is, the scheduled time to be displayed on the display unit 4 is also dynamically changed.

According to the above-described configuration, the user may recognize the scheduled printing execution time for each of the selectable settings. Thus, the user may recognize the scheduled printing time corresponding to each of the setting options before selecting the setting. In particular, when the printing is executed with highest priority on cost, the user may have to wait for a long period of time until the time period of the lowest power cost comes. However, since the user may recognize the scheduled printing time at which the printing is executed, the user may select the setting icon based on the user preference. Therefore, the usability may be improved.

In the display example illustrated in FIG. 4, the plurality of setting icons is displayed on the display unit 4, but the embodiment is not limited thereto. For example, after one setting icon displayed on the display unit 4 is selected by the user, the other non-selected icons may be hidden (i.e., not displayed on the display unit 4). As a result, the user can easily recognize the selected setting. In this case, when the user de-selects the selected setting icon, the other non-selected icons may show up again.

In the above-described configuration, the CPU 1 determines the scheduled process start time according to the setting icon selected by the user, as described above, and displays the scheduled time in association with the selected setting icon. That is, the scheduled time to be displayed in association with the setting icon is dynamically changed. When the immediate execution button is selected by the user, the CPU 1 does not cause the display unit 4 to display the scheduled time. Thereafter, when the start button of the printing is selected by the user, the control unit 103 executes a process in accordance with the setting icon selected by the user. Here, the setting icon selected by the user is the one setting icon displayed on the display unit 4. For example, when the setting icon selected by the user is the immediate execution button, the control unit 103 executes the process of printing for the print data immediately after the start button is selected.

In the above-described configuration, the user can easily recognize which setting is selected. For example, when the plurality of setting icons is displayed, the setting icon selected by the user may not be distinguished apparently from the unselected setting icons in some cases. In this case, the user may not notice that the print data is printed based on the setting of the erroneously selected setting icon. In contrast, when only one setting icon selected by the user is displayed on the display unit 4, the user may immediately recognize the setting icon selected by the user. Therefore, it is less likely that the print data is printed based on the setting of the erroneously selected setting icon.

The CPU 1 may disable the corresponding restricted time period setting icon when the low-cost company is not changed during the restricted time period indicated by the restricted-time period setting icon. For example, the CPU 1 may gray out the corresponding restricted-time period setting icon and may prompt the user not to select the corresponding restricted-time period setting icon.

The determination unit 102 may determine the power supply company and the printing time period based on the number of sheets to be printed. Specifically, when the number of sheets is less than a predetermined number, the determination unit 102 determines that the printing process for the print data is executed immediately. In this case, the CPU 1 performs the printing process immediately after an instruction to execute the printing is input. In contrast, when the number of sheets is equal to or greater than the predetermined number, the determination unit 102 determines the low-cost company and the printing time period with reference to the power cost information. For example, the determination unit 102 determines the power company 20 of which the power cost is less than the predetermined threshold value with reference to the power cost information stored in the memory 8. When there are the plurality of power companies 20 of which the power cost is less than the predetermined threshold value, the determination unit 102 may determine the power company 20 with the lowest power cost as the low-cost company. Next, the determination unit 102 determines the printing time period based on the power cost information of the determined power company 20 with reference to the power cost information stored in the memory 8. Then, the control unit 103 executes the printing process within the determined printing time period using the power from the determined low-cost company. The control unit 103 may execute the printing process at any time when the time is within the determined printing time period.

According to the above-described configuration, a flexible printing operation may be carried out. For example, when the number of sheets to be printed is less than the predetermined number, the number of sheets is relatively small. Therefore, when the power cost is high, the usability is not compromised by waiting until the period of time with the lower power cost. In contrast, when the number of sheets is equal to or greater than the predetermined number, the number of sheets is relatively large. Therefore, by waiting up to the period of time in which the power cost is low for executing the printing, it is possible to suppress the power cost. Thus, by changing the execution time of the printing process for the print data and the power supply company according to the number of sheets to be printed, flexible printing process can be carried out.

The image forming apparatus 10 may determine the power supply company and the printing time period according to a printing type. The print type is, for example, color printing or monochrome printing. According to the above-described configuration, when the printing type is the monochrome printing, the determination unit 102 determines that the printing process is executed for the print data immediately. In this case, the CPU 1 performs the printing process immediately after an instruction to execute the printing is input. In contrast, when the printing type is the color printing, the determination unit 102 determines the low-power company and the printing time period with reference to the power cost information. For example, the determination unit 102 determines the power company 20 of which the power cost is less than the predetermined threshold value with reference to the power cost information stored in the memory 8. When there are the plurality of power companies 20 of which the power cost is less than the predetermined threshold value, the determination unit 102 may determine the power company 20 with the lowest power cost as the low-cost company. Next, the determination unit 102 determines the printing time period based on the power cost information of the determined power company 20 with reference to the power cost information stored in the memory 8. Then, the control unit 103 executes the printing process within the determined printing time period using the power from the determined low-cost company. The control unit 103 may execute the printing process at any time when the time is within the determined printing time period.

According to the above-described configuration, a flexible printing process can be carried out. For example, when the printing type is the monochrome printing, the power consumption is lower than that of the color printing. Therefore, when the power cost is high, the usability may not be compromised by waiting until the period of time with the lower power cost. On the other hand, when the printing type is the color printing, the power consumption is higher than that of the monochrome printing. Therefore, by waiting up to the printing time period in which the power cost is low, it is possible to reduce the power expense. Thus, flexible printing operation may be carried out by changing the execution time of the printing process for the print data and the power supply company according to the printing type.

When there is a plurality of power companies 20 of which the power cost is the same at the time of the determination of the power supply company, the determination unit 102 may determine the power supply company based on the priority set in advance for each power company 20. According to the above-described configuration, the image forming apparatus 10 stores a priority information table. The priority information table includes records (hereinafter referred to as "priority information records") including information regarding the priority of each power company 20. The priority information table is stored in the auxiliary storage device 3.

Figure 7:
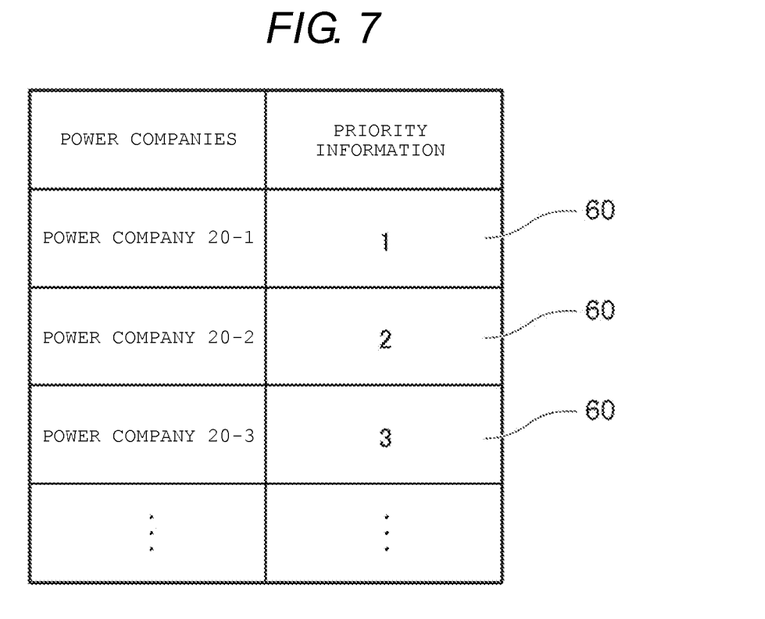
FIG. 7 illustrates an example of a priority information table stored in the image forming apparatus.

FIG. 7 is a diagram illustrating a specific example of the priority information table.

The priority information table includes a plurality of priority information records 60. Each of the priority information records 60 includes a value indicating a power company and a value indicating the priority of the power company. The value of the power company indicates a power company, which is a candidate of the power supply source. The value of the priority indicates priority associated with the corresponding power company of the same priority information record 60. In the priority information, the lower a number is, the higher the priority is. That is, when the value of the priority information is 1, this value indicates that the priority is the highest.

In the example illustrated in FIG. 7, the plurality of power companies are registered in the priority information table. These power companies are the "power company 20-1," the "power company 20-2," and the "power company 20-3."

In FIG. 7, the priority information record 60 recorded in the top row of the priority information table indicates that the value of the power company is the "power company 20-1" and the value of the priority information is "1." That is, it is indicated that the priority of the power company, the "power company 20-1," is the highest.

In FIG. 7, the priority information record 60 recorded in the second row of the priority information table indicates that the value of the power company is the "power company 20-2" and the value of the priority information is "2." That is, it is indicated that the priority of the power company, the "power company 20-2," is the second highest.

In FIG. 7, the priority information record 60 recorded in the third row of the priority information table indicates that the value of the power company is the "power company 20-3" and the value of the priority information is "3." That is, it is indicated that the priority of the power company, the "power company 20-3," is the third highest.

Hereinafter, a process based on the priority information table will be described with reference to a specific example.

(Case in which Power Costs of Power Companies 20-1 and 20-2 are the Same)

First, the CPU 1 reads out the priority information table stored in the auxiliary storage device 3. Next, the CPU 1 selects the priority information records 60 corresponding to the power companies 20-1 and 20-2 among the priority information records 60 of the read-out priority information table. Then, the CPU 1 acquires each of the values recorded in the items of the priority information of the selected priority information records 60. The CPU 1 compares the acquired values and determines the power company 20 with the higher priority (lower number) as the power supply company. Specifically, the priority information of the power company 20-1 is 1 and the priority information of the power company 20-2 is 2. Therefore, the CPU 1 determines the power company 20-1 as the power supply company.

According to the above-described configuration, the power supply company may be determined even when there is the plurality of power companies 20 with the same power cost. When the CPU 1 determines the power supply company, the CPU 1 determines the power company 20 with the higher priority as the power supply company based on the priority information table. Accordingly, it is not necessary to determine the power supply company through a calculation process or the like. Therefore, it is possible to determine the power supply company easily.

According to at least one embodiment described above, the usability may be improved by including the determination unit that determines the power supply company serving as the power supply source based on information regarding the power cost per time acquired from the plurality of power companies and the control unit that executes the process using the power supplied from the determined power company.

The function of the image forming apparatus 10 according to the above-described embodiment may be achieved by a computer. In this case, a program for achieving the function may be recorded on a computer-readable recording medium and the program recorded on the recording medium may be read and executed by a computer system. The "computer system" mentioned herein is assumed to include an OS or hardware such as peripheral devices. The "computer-readable recording medium" refers to a portable medium such as a flexible disk, a magneto-optical disc, a ROM, or a CD-ROM or a storage device such as a hard disk included in the computer system. The "computer-readable recording medium" may include a recording medium that retains a program dynamically for a short time, as in a communication line when a program is transmitted via the communication line such as a telephone line or a network such as the Internet, and a recording medium that retains a program for a given time, as in a volatile memory in a computer system serving as a server or a client in this case. The program may be a program for achieving some of the above-described functions or may be a program for achieving the above-described functions in combination with a program already recorded in a computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image processing apparatus comprising:
    an image processing unit configured to carry out processing on an image formed on a sheet;
    a power unit for the image processing unit connected to a plurality of power grids;
    a storage unit configured to store information about cost of power supplied from each of the power grids; and
    a control unit configured to select one of the power grids based on the stored information, and control the power unit to supply power from the selected power grid to the image processing unit.
2. The image processing apparatus according to claim 1, wherein
    the control unit selects the power grid when the cost of the power therefrom is the lowest during a certain period of time within a predetermined period of time.
3. The image processing apparatus according to claim 1, further comprising:
    a communication unit configured to receive the information, wherein
    the storage unit stores the received information.
4. The image processing apparatus according to claim 1, further comprising:
    an operating unit configured to receive a user input designating a period of time within which the image processing unit is allowed to carry out the processing, wherein
    the control unit selects the power grid further based on the user input.
5. The image processing apparatus according to claim 4, wherein
    the control unit controls the image processing unit to carry out the processing within the designated period of time.

6. The image processing apparatus according to claim 4, wherein the control unit is further configured to determine a processing time period during which the processing unit carries out the processing within the designated period of time, based on the information and the user input, and control the image processing unit to carry out the processing during the processing time period.

7. The image processing apparatus according to claim 4, further comprising:

a display unit configured to display a start time of the processing time period.

8. The image processing apparatus according to claim 4, further comprising:

a display unit configured to display a plurality of operational modes, each of which is associated with a different period of time within which the image processing unit is allowed to carry out the processing, wherein the operating unit configured to receive as the user input selection of one of the operational modes.

9. The image processing apparatus according to claim 1, wherein the storage unit further stores a data table including priority information among the plurality of the power grids, and the control unit selects the power grid further based on the priority information.

10. The image processing apparatus according to claim 1, wherein the image processing unit is a fixing unit configured to fix the image on the sheet with heat generated using the power supplied from the power unit.

11. A method for operating an image processing apparatus, comprising:

selecting a power grid from a plurality of power grids, based on information about cost of power supplied from each of the power grids;

supplying power from the selected power grid to an image processing unit; and carrying out, at the image processing unit, processing on an image formed on a sheet using the supplied power.

12. The method according to claim 11, wherein a power grid of which cost of the power is the lowest during a certain period of time within a predetermined period of time is selected as the power grid.

13. The method according to claim 11, further comprising:

receiving, at a communication unit, the information; and storing the received information in a storage unit.

14. The method according to claim 11, further comprising:

receiving at an operating unit, a user input designating a period of time within which the image processing unit is allowed to carry out the processing, wherein the power grid is selected further based on the user input.

15. The method according to claim 14, wherein the processing is carried out within the designated period of time.

16. The method according to claim 14, further comprising:

determining a processing time period during which the processing is carried out, within the designated period of time, based on the information and the user input, wherein the processing is carried out during the processing time period.

17. The method according to claim 14, further comprising:

displaying on a display unit a start time of the processing time period.

18. The method according to claim 14, further comprising:

displaying on a display unit a plurality of operational modes, each of which is associated with a different period of time within which the image processing unit is allowed to carry out the processing, wherein the user input is selection of one of the operational modes.

19. The method according to claim 11, further comprising:

storing a data table including priority information among the plurality of the power grids, wherein the power grid is selected further based on the priority information.

20. A non-transitory computer readable medium comprising a program that is executable in a computing device to cause the computing device to perform operating an image processing apparatus, the method comprising:

selecting a power grid from a plurality of power grids, based on information about cost of power supplied from each of the power grids;

supplying power from the selected power grid to an image processing unit; and carrying out, at the image processing unit, processing on an image formed on a sheet using the supplied power.

* * * * *